United States Patent [19]
Badovick

[11] 3,767,182
[45] Oct. 23, 1973

[54] ADJUSTABLE HEEL STAND FOR USE WITH WORKPIECE CLAMPS

[75] Inventor: Peter Badovick, Parma, Ohio

[73] Assignee: New Chance Machine & Tool Co., Cleveland, Ohio

[22] Filed: June 7, 1971

[21] Appl. No.: 150,456

[52] U.S. Cl. ............... 269/94, 248/354 S, 269/184, 269/309
[51] Int. Cl. ............................................. B23q 3/02
[58] Field of Search ..................... 248/354 S, 361 B; 269/91–95, 99, 100, 184–187

[56] References Cited
UNITED STATES PATENTS

| 986,464 | 3/1911 | Jack | 269/184 X |
| 1,072,363 | 9/1913 | Roberts | 269/94 X |
| 3,709,479 | 1/1973 | Dolphin | 269/309 |

FOREIGN PATENTS OR APPLICATIONS

| 1,065,089 | 12/1953 | France | 248/354 S |
| 1,050,149 | 12/1966 | Great Britain | 269/94 |

Primary Examiner—Donald G. Kelly
Assistant Examiner—Neil Abrams
Attorney—McCoy, Greene & Howell

[57] ABSTRACT

A vertically adjustable heel stand for use with clamping devices for holding workpieces. The stand has a cylindrical tubular base with a top plate that supports a vertical stem extending through an elongated opening in the plate. The stem has oppositely extending lands corresponding in shape and size to the opening and axially spaced apart a distance at least equal to the thickness of the plate. The stem can be turned relative to the opening so that the lands bear upon the top plate closely adjacent the vertical projection of the cylindrical side walls of the tubular base.

3 Claims, 5 Drawing Figures

Patented Oct. 23, 1973 3,767,182

INVENTOR.
PETER BADOVICK
BY
McCoy, Greene & Howell
ATTORNEYS

ADJUSTABLE HEEL STAND FOR USE WITH WORKPIECE CLAMPS

BACKGROUND OF THE INVENTION

This invention relates to the holding and clamping of workpieces prepratory to a machining operation or the like. More particularly the invention relates to a heel stand for use in connection with clamping devices that secure a workpiece in a desired position relative to a tool head.

Large machine tools such as boring mills, drill presses, broaches, reamers and the like are often used to machine a great many different types and sizes of workpieces in a machine shop, particularly when the shop is not used for assembly line type production work. In these circumstances it is necessary to have temporary removable clamping means that can be used in different ways to secure a great variety of workpieces to a work table.

One type of device for this purpose utilizes a generally horizontal clamping bar supported at one end by a heel stand and bearing with clamping force against the work piece at the other end. The bar is pulled downward at its central portion (the heel stand acting as a fulcrum) by means of a bolt extending through an opening in the mid-span of the bar, and having its head anchored, for example, in a T-slot in the work table. A nut threaded onto the end of the bolt extending through the bar is tightened down against the top of the bar. Thus the nut and bolt serve to apply clamping force to the workpiece.

In such devices the stand should be vertically adjustable to approximately the same vertical distance above the work table as the location on the workpiece against which the clamping bar will bear. This has led to the development of heel stands with two interadjustable parts that may be extended or telescoped relative to one another to a number of different vertical levels. One type of device uses a threaded connection between the two parts, while another type uses a plurality of alternating lands and grooves on a stem that can be interlocked in a desired location with a cooperating part on a base.

This invention relates to the latter type of heel stand and provides an improved interlocking arrangement as well as an improved transfer of stresses between the two parts.

Prior art heel stands of the type to which the present invention relates, have utilized, for example, spaced rectangular lands and grooves on a stem that may be rotated between a position where the lands are axially movable through a matching opening in the top plate of the base, and a position wherein the lands bear against interlocking portions of the top plate to support the stem on the base in such a way that bearing force is transferred through the lands and top plate to the side walls of the base. Due to the bending moment acting on the top plate due to forces acting through the stem, prior art devices have, of necessity, been of fairly massive construction and have been both costly and difficult to fabricate.

The heel stand of the present invention, however, resolves the difficulties indicated above and affords other features and advantages heretofor not obtainable.

SUMMARY OF THE INVENTION

It is among the objects of the invention to provide an improved heel stand of the type utilizing interlocking lands and grooves that bear against the top of a tubular base, that is of lighter construction and less costly to manufacture.

Another object is to provide a heel stand of the type described which affords a more efficient transfer of bearing force between the two movable members.

These and other objects are accomplished by means of a heel stand of the type described, including an upright tubular base defining an interior cylindrical space and with a top plate defining an elongated opening communicating with the interior space. The opening has arcuate ends with a radius of curvature corresponding to the radius of the side walls of the space and sides inwardly spaced from the side walls.

A vertically adjustable upright stem located partially within the space, extends through the opening and has a plurality of radially extending axially spaced lands symmetrical about the axis of the stem. The lands correspond in shape and size to the opening and are axially movable therethrough when in a predetermined orientation relative to the opening so as to be in registration therewith. The lands are uniformly spaced apart along the axis of the stem a distance at least as great as the thickness of the top plate and the stem is rotatable about its axis in the opening when positioned with the top plate between adjacent lands.

When the top plate is between adjacent lands and the lands are turned out of registration with the opening, one of the lands bears against the top plate in such a way that its ends bear at a position almost directly above the side walls of the base or in other words they extend radially almost to the vertical projection of the side walls.

DESCRIPTION OF THE PREFERRED EMBODIMENT

Figure 1:
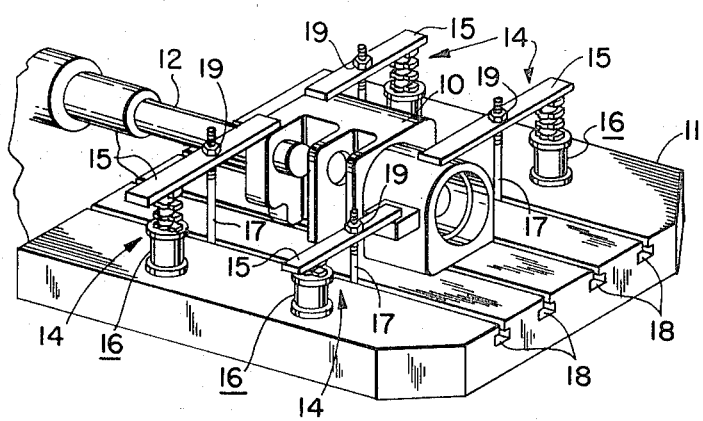
FIG. 1 is a perspective view showing a plurality of clamping devices holding a workpiece, each clamping device having a heel stand embodying the invention.

Referring more particularily to the drawings and initially to FIG. 1 there is shown a workpiece 10 positioned on a work table 11 at the desired location to be operated upon by a machine tool head 12. The workpiece 10 is securely clamped to the work table 11 by means of four clamping devices 14 that engage and bear against the workpiece at a variety of advantageous locations.

Each of the clamping devices 14 includes a horizontal clamping bar 15 that bears at one end against a heel stand 16, embodying the invention and at its other end against a portion of the workpiece 10. Each clamping device 14 includes a bolt 17 with its head slidably received in one of 4 T-slots 18 in the work table 11. The bolts 17 extend through holes in the mid portion of the clamping bars 15 and nuts 19 are tightened down on the bolts against their respective clamping bar 15 to apply clamping force to the workpiece 10.

The heel stand 16 of the invention is best illustrated in FIGS. 2 through 5 which illustrate the preferred construction. The stand includes a base 20 and an upright stem 21 that cooperates with and is adjustable relative to the base 20 to provide for an extension to a number of different vertical levels for supporting a clamping bar 15. Both the base 20 and stem 21 are preferably formed of steel.

The base 20 includes a sole plate 22 and a top plate 23 both of which are welded to an upright tubular body 24. The body 24 defines a cylindrical space 25 therewithin that receives a lower portion of the stem 21 depending upon the particular vertical level, of adjustment.

Figure 2:
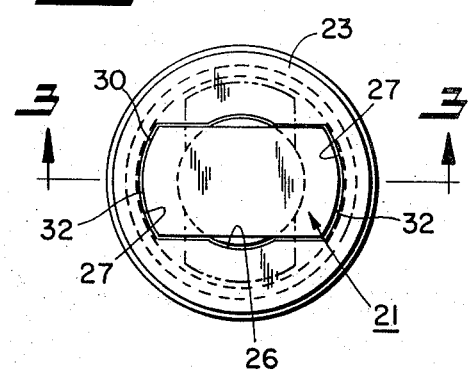
FIG. 2 is a plan view of one of the heel stands of FIG. 1.
Figure 4:
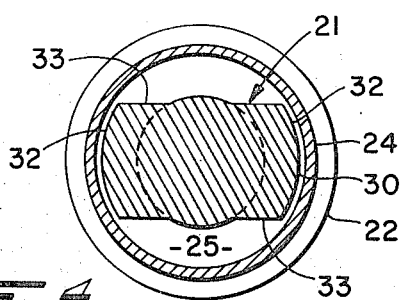
FIG. 4 is a horizontal section taken on the line 4—4 of FIG. 3.

The top plate 23 has an opening 26 formed with a contour best illustrated in FIG. 2. As indicated the opening has a generally elongated form, symmetrical about the axis of the base 20 and with its ends 27 having an arcuate form with a radius of curvature essentially the same as and coaxial with the interior cylindrical wall of the base 20.

The stem 21 has a generally elongated form and is generally symmetrical about a central axis. When the stem 21 is assembled with the base, the axis of the stem is coaxial with the center of curvature of the upright tubular body 24.

Figure 3:
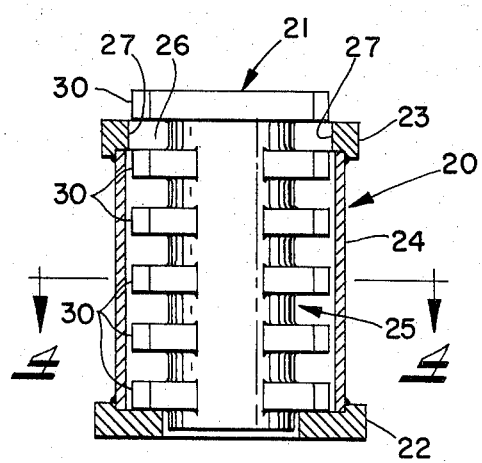
FIG. 3 is a sectional view of the heel stand of FIG. 2 taken on the line 3—3 of FIG. 2.
Figure 5:
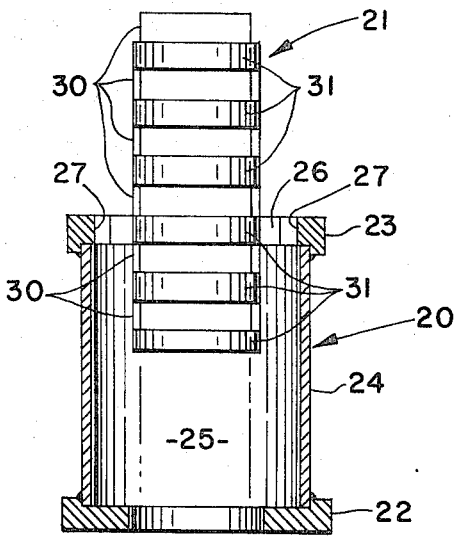
FIG. 5 is a sectional view similar to FIG. 3 but showing the heel stand adjusted to provide a higher vertical level.

As best seen in FIGS. 3 and 5 the stem 21 is provided with seven axially spaced lands 30 spaced apart a distance corresponding essentially to the thickness of the top plate 23 of the base, each land 30 having two parts extending radially in opposite directions from the axis of the stem. Thus, the lands 30 define therebetween six spaced grooves 31.

The lands 30 correspond in shape and size to the opening 26 in the top plate 23 so that when the stem 21 is turned in the base to a position with the lands 30 at an angular orientation in registration with the opening 23 (FIGS. 2 and 3), the stem 21 may be moved in an axial direction into and out of the interior cylindrical space 25 within the base 20. However, when the stem 21 is turned from that particular angular orientation one of the grooves 31 receives the portions of the top plate 23 at the sides of the opening 26 and the particular land 30 immediately above the top plate 23 bears against the plate 23 so that the stem 21 is retained and supported at the particular vertical level of adjustment to which it has been moved (FIG. 5).

It will be noted that the outer ends 32 of the lands 30 have an arcuate form with a radius of curvature centered at the axis of the stem 21 and roughly equal to the radius of curvature of the ends 27 of the opening 26 in the top plate 23. Accordingly, when the stem 21 is rotated, for example, 90° from the position shown in FIG. 3 to the position shown in FIG. 5 the ends of the land 30 that bears against the top plate 23, bear in a horizontal zone that extends almost to the vertical projection of the cylindrical walls of the tubular body portion 24 of the base 20. Thus the load to be carried by the clamping device 14 is transferred from the stem 21 to the top plate 23 with very little bending moment and in fact the stress in the top plate 23 is almost entirely in compression and sheer with essentially no tensile stress occurring.

It will also be noted that one of the lands 30 is located at the upper end of the stem 21 as viewed in FIGS. 2 through 5 whereas one of the grooves 31 is located adjacent the lower end. It will also be apparent that the stem 21 may be removed and reversed if desired. Since the groove at the bottom end has only half the thickness of the other grooves, the increments of adjustment are in increments that are at levels located midway between the levels provided by the increments when the stem is in the position shown in FIGS. 2 through 5. Accordingly, adjustment may be made not only between increments corresponding to the axial spacing of the lands 30 but also to increments corresponding to one half the axial spacing of the lands.

It will also be noted that if a somewhat oblique load is applied to the top of the stem 21 any tendency of the stem to tilt relative to the base 30 will be resisted by the fact that the curved ends of the lands are very closely adjacent and may engage the vertical cylindrical side wall of the central body 24 of the base 20. Thus any tendency of the stem to tilt to one side will be resisted and the possibility of slippage or other failure of the clamping device is reduced.

While the invention has been shown and described with reference to a specific embodiment thereof, this is for the purpose of illustration rather than limitation and other variations and modifications will be apparent to those skilled in the art upon reading of the specification and claims. Accordingly, the patent is not to be limited in scope and effect to the specific embodiment herein shown and described nor in any other way that is inconsistant with the extent to which the progress in the art has been advanced by the invention.

I claim:

1. In a device for clamping a workpiece on a worktable, including a generally horizontal clamping bar that bears at one end against a portion of the workpiece, a heel stand resting on the worktable and adjustable to a vertical level for supporting one end of the clamping bar with the bar in approximately a horizontal position and means connected between the worktable and the bar for applying clamping force to the workpiece, the improvement wherein said heel stand comprises:

an upright base comprising a horizontal sole plate, a tubular side wall extending vertically upwardly therefrom and defining an interior cylindrical space, and a top plate with an opening communicating with and symmetrical about the axis of said space, said opening comprising a centrally disposed aperture of predetermined diameter and having elongated diametrically oppositely extending portions of a width less than said predetermined diameter, said portions having outer edges defining diametrically opposed arcs of a circle with a radius essentially corresponding to the radius of said cylindrical space, and an elongated stem symmetrical about a central axis said stem extending through said opening and terminating within said cylindrical space, said stem comprising a shaft having a minimum diameter throughout closely approximating said perdetermined diameter and a plurality of radially extending, axially spaced lands corresponding in size and shape to said portions of said opening and movable therethrough when turned to proper registration therewith, said lands being spaced apart a distance essentially corresponding to the thickness of said top plate, each land comprising solely a pair of oppositely extending symmetrical portions, the ends of which define diametrically opposed arcs corresponding generally to the arcs defined by the outer edges of said opening in said top plate, whereby when said stem is rotated about its axis to place said lands out of registration with said opening, one of said lands rests against said top plate with its ends extending radially to a postiion closely adjacent the axial projection of the side wall of said base, whereby the load supported by said stem is transmitted to said sidewall of said base in compression and sheer to avoid tensile stresses caused by bending moments and the disposition of said closely approximating diameter of said stem within said centrally disposed circular aperture functions to maintain a coaxial relationship between said tubular sidewall and said stem during both rotative positions thereof.

2. A heel stand as defined in claim 1 wherein said shaft is cylindrical about the axis of said stem and said lands define grooves therebetween, said grooves being bounded by the cylindrical surface of said shaft.

3. A heel stand as defined in claim 2 wherein said shaft has a diameter about two thirds the diameter of said cylindrical space.

* * * * *